United States Patent [19]

Stahl

[11] Patent Number: 4,971,771

[45] Date of Patent: Nov. 20, 1990

[54] MODULAR MANIFOLD MEANS FOR DISTRIBUTING A FLOW OF A GAS IN A PREFERABLY CATALYTIC REACTOR

[75] Inventor: Henrik O. Stahl, Kokkedal, Denmark

[73] Assignee: Haldor Topsøe A/S, Lyngby, Denmark

[21] Appl. No.: 195,866

[22] Filed: May 19, 1988

[30] Foreign Application Priority Data

May 20, 1987 [DK] Denmark .................. 2570/87

[51] Int. Cl.$^5$ ................................ B01J 8/02
[52] U.S. Cl. ......................... 422/218; 422/211; 422/181; 422/239; 55/418; 55/476; 55/DIG. 30; 60/299; 60/301
[58] Field of Search ........... 422/218, 211, 177, 181, 422/239; 55/418, 476, DIG. 30; 60/299, 301

[56] References Cited

U.S. PATENT DOCUMENTS

| 4,149,862 | 4/1979 | Sewell, Sr. ............... 422/181 X |
| 4,198,002 | 4/1980 | McClain ................... 422/211 X |
| 4,244,922 | 1/1981 | Burke et al. .............. 422/218 |
| 4,374,095 | 2/1983 | Legg et al. ............... 422/218 |
| 4,405,562 | 9/1983 | Zardi et al. .............. 422/218 X |
| 4,421,723 | 12/1983 | Farnham ................... 422/218 |
| 4,576,799 | 3/1986 | Worner et al. ............ 422/181 X |
| 4,594,227 | 6/1986 | Ohsaki et al. ............ 422/218 X |
| 4,597,946 | 7/1986 | Ward ...................... 422/190 |

Primary Examiner—Robert J. Warden
Assistant Examiner—Lynn M. Kummert
Attorney, Agent, or Firm—Kerkam, Stowell, Kondracki & Clarke

[57] ABSTRACT

A modular manifold arrangement for distributing a flow of a gas in a reactor. The manifold arrangement includes a tank or a container, within the walls of which a bed for a granulated catalyst or substance, with which the gas is to react, is arranged. The bed is at least partially surrounded by gas-permeable gratings. In order to provide elements that may pass through a narrow manhole and from which it is possible to construct passages for providing a uniform flow through the reactor bed, the manifold arrangement includes an elongate tube. The tube is closed at one end and open for inlet of gas at the other end. The tube further has a gas-impermeable rear sidewall with a shape corresponding to the walls of the tank and a front side which is a gas-permeable grating having a sheet or plate provided therein with a large number of nozzles.

11 Claims, 2 Drawing Sheets

MODULAR MANIFOLD MEANS FOR DISTRIBUTING A FLOW OF A GAS IN A PREFERABLY CATALYTIC REACTOR

The present invention relates to modular manifold means for distributing a flow of a gas in a reactor, and to a reactor, in which a plurality of said means are used.

In reactors of the known type the bed or each bed of granulate, through which a gas is to flow, is, or are, at least on one side, enclosed by perforated plates or gratings, through which the gas may flow. The grating may be arranged both at the inlet and the outlet of the bed or on the underside of the bed, the upper face being left open. In the first case, the flow will typically be horizontal, whereas the flow in the second case will be vertical. In all cases, the grating must be able to withstand the pressure from the weight of the granulate.

In known reactors the inlet of gas is arranged in such a way that the gas is distributed with a uniform pressure level around the inlet side, and what is aimed at is to ensure that the resistance to the flow is the same independently of the path of the flow. A frequently used way of obtaining uniform flow paths is to arrange the bed with rotational symmetry to an axis and to have a radial flow through the annular bed for the granulate, which is located in the interspace between the gratings shaped as two cylindrical shells, the outer one forming the inlet and the inner one forming the outlet from the bed. In order to further improve the uniformity of the flow a shell with a plurality of nozzles may be arranged on the outside of the grating on the inlet side, so that the gas has to pass through the nozzles before entering into the granulate through the grating.

In certain cases the accessibility to the bed is so restricted inside the wall of the tank that the construction of concentric shells inside the tank is impractical. This is especially the case, if the diameter of the opening, through which the gratings and the shell with the nozzles must pass in order to be assembled as a bed for the granulate, is smaller than the diameter of especially the outer grating and the shell with the nozzles.

The object of the present invention is to provide modular manifold means, which may pass separately through a comparatively narrow opening, and by means of which it is possible to construct gas inlet channels through which a uniform gas flow through the granulate is ensured both with a parallel or radial flow pattern in the tank.

According to the invention this is obtained with modular manifold means as explained below. Owing to the fact that the modules are shaped as elongate tubes they will be able to pass through comparatively narrow openings. After having been introduced into the tank, they can be placed with the gas-impermeable rear face alongside the tank wall and with the gas-permeable grating facing the inside of the tank, which is subsequently filled with granulate. The sheet or plate with nozzles inside the grating ensures that a pressure drop will set in just before the gas enters the granulate through the grating in order to ensure the establishing of a uniform flow through the grating on the front face of the distributing element. Preferably, the cross-section of the modules is such that a plurality of elements arranged in array side by side forms a gas-impermeable rear face and a front face substantially covered by the grating and nozzle plate. With such an array of elements the same flow paths may be obtained as with beds constructed from coherent cylindrical shells.

According to a preferred embodiment of the invention the nozzle plate is fastened to the two longitudinal edges of the grating. As the plate, in which the nozzles are present, is made from a thin metal sheet provided with holes, the diameter of which is preferably greater than 0.7 times the sheet thickness, it is advantageous to let the plate rest on the grating, in which case the plate does not need the rigidity to withstand the pressure from the pressure drop over the nozzles without bending.

In other cases the plate with the nozzles may have the shape of a tube passing through the whole length of the module, which tube is assembled in a gas-tight manner to the rest of the module at the open end of the module. The tube with the nozzles may have the same cross section as the element and is preferably provided with nozzles only on the side facing the grating.

The manifold module according to the invention may preferably be used in a catalytic reactor for the synthesis of ammonia. Such a reactor comprises a pressure shell provided with a manhole and connecting pieces for inlet and outlet of an ammonia synthesis gas, and at least one catalyst bed shaped as an annular bed arranged between concentric perforated walls placed coaxially within the pressure shell and limited in axial direction by means of substantially gastight walls. According to the invention the outer wall is constructed from modular manifold means arranged in close array with the impermeable rear face facing away from the catalyst bed.

A preferred embodiment of the reactor, in which the thermal stress on the pressure shell is reduced, is characterized in that inside the pressure shell a concentric gas-tight inner shell is arranged in order to provide a narrow annular interspace between the pressure shell and the inner shell, through which room part of the synthesis gas is directed for cooling of the pressure shell, before it is directed to the catalyst bed, and that the modular manifold means are placed with the rear face along the inner shell.

The invention is further described in the following with reference to the drawings showing a catalytic or chemical reactor with radial flow through a bed containing a catalyst granulate, and in which the inlet of gas to the bed is provided by means of the modular manifold means according to the invention. In the drawings.

Figure 1:
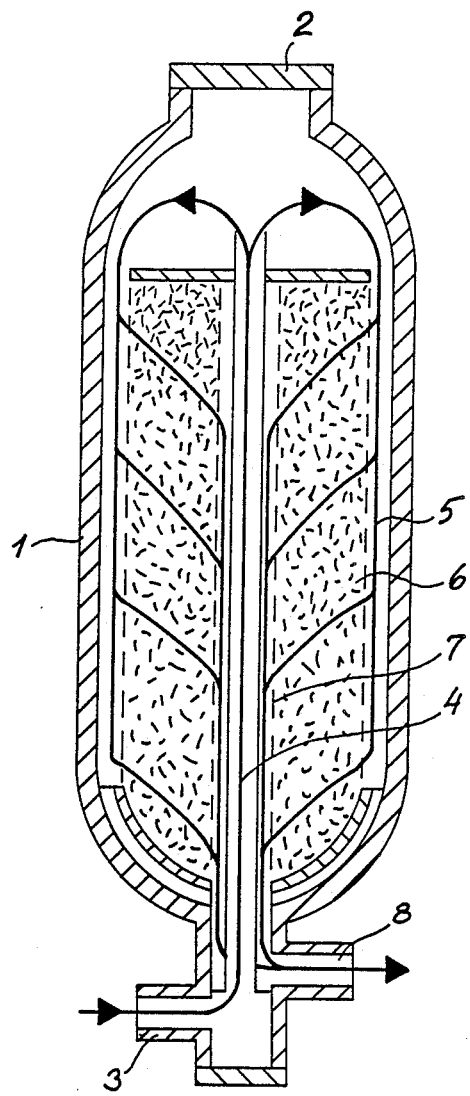
FIG. 1 shows a longitudinal section through the reactor.

The reactor shown in a longitudinal section in FIG. 1 comprises a tank 1 or container in the form of a pressure shell, which at one end has a manhole 2 in order to provide access for inspection and replacement of the catalyst inside the tank. At the other end of the tank a connecting piece 3 at the inlet to a central gas channel 4 is mounted. The catalyst in form of a granulate 6 is placed between manifold means 5 and an internal outlet grate 7. From the inlet 3 the gas flows along the path indicated by arrows and leaves the tank through the connecting piece at the outlet 8. In FIG. 1 the modular manifold means 5 are seen in a longitudinal section. They are open at their upper end in the drawing, whereas the lower end is closed.

Figure 2:
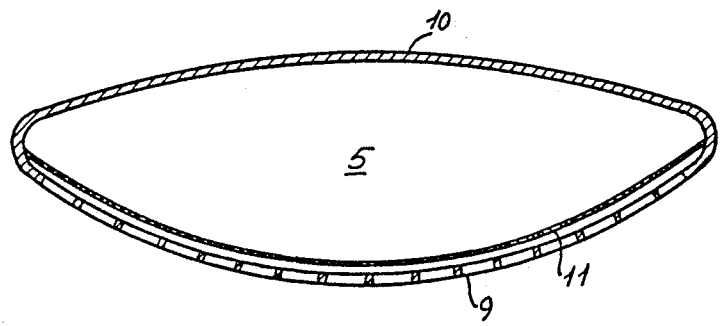
FIG. 2 shows a section through the element according to the invention.

FIG. 2 shows a section through a manifold module 5. The module has a front face comprising a grating 9, with openings, through which the gas may flow, but the openings are smaller than the grain size of the granulate 6. At the longitudinal edges of the grating 9 it is connected with a rear wall 10, which has a shape that generally corresponds to the inside wall of the tank 1. Inside the manifold module a thin metal sheet 11 is placed, which sheet has a large number of essentially uniformly distributed holes. The size of the holes exceeds 0.7 times the thickness of the sheet. This value corresponds to the limit, at which the shape of the edges of the hole does not have any substantial influence on the resistance of the flow through the nozzle formed by the hole. In order to use a large number of holes placed in a close relation, it is appropriate that the sheet 11 is thin, but in that case it cannot resist the force from the pressure difference relating to the flow resistance through the holes without bending. It may in some cases be advantageous that the sheet 11 is in close relationship with the grating 9 and is supported by it.

Figure 3:
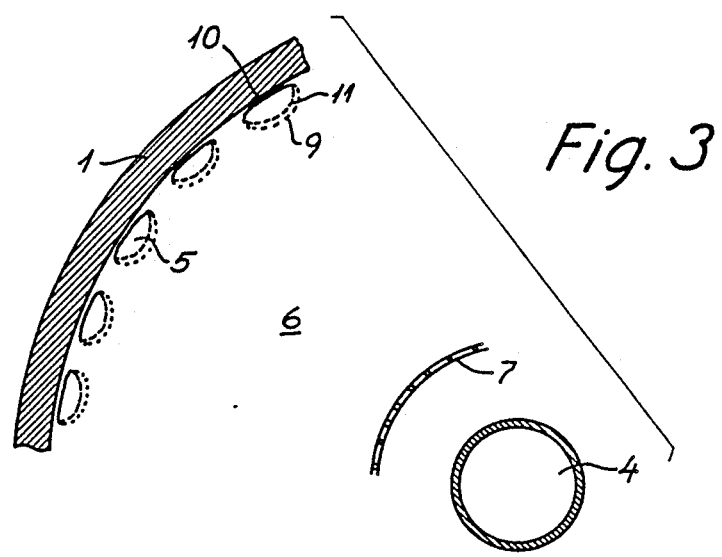
FIG. 3 shows a cross-section through the reactor according to FIG. 1.

FIG. 3 shows in part a section through the reactor according to FIG. 1. The manifold modules 5 are mounted with their rear sides facing the container wall 1. The modules 5 may as shown be placed in spaced array or possibly in close relationship, thus forming a wall which is gas-tight on its rear side, and the front face of which substantially consists of grating. In the drawing also the gas passage 4 and the internal grate 7 are indicated.

The modular manifold means 5 and the other parts in the reactor are installed in the tank 1 through the manhole 2. After closing the cover of the manhole 2, the reactor may be put into operation. The gas flows through the inlet 3, through the passage 4 to the space above the catalyst bed 6, from where it flows downwards through the manifold means 5. Owing to the pressure drop from the gas flow through the nozzles or holes in the sheets or plates 11 an even flow distribution between all the modules placed in a circle along the wall of the tank 1 as shown in FIG. 3 is obtained. The pressure drop will also have the effect that the gas will flow with the same mass-flow through all the holes in the sheets or plates 11. A substantially uniform flow radially through the granulate 6 towards the grating 7 is therefore obtained, which flow continues through the narrow interspace between the grating 7 and the passage 4 to the outlet 8, through which the gas leaves the reactor.

I claim:
1. Modular manifold means for distributing a flow of gas in a reactor comprising:
   a tank having walls;
   a bed of granulated catalyst or substance arranged within the walls and with which the gas is to react;
   a plurality of manifold modules arranged between the walls and the bed, each comprising an elongate tube having a closed end and an open end for inlet of gas, each of said elongate tubes having a gas-impermeable rear sidewall with a shape corresponding to the walls of the tank and positioned adjacent thereto, and a front side having a gas-permeable grating and a plate disposed behind said grating, said plate having a plurality of nozzles.

2. Modular manifold means according to claim 1, wherein the plurality of manifold modules are constructed such that, if placed side by side in close relationship, the manifold modules form a substantially gas-impermeable rear side wall and a front side that is substantially covered by the plate and the grating.

3. Modular manifold means according to claim 2 wherein, for each of said plurality of manifold modules, the plate has a thickness and the nozzles have means defining orifices with a diameter larger than 0.7 times the thickness of the plate.

4. Modular manifold means according to claim 2 wherein, for each of said plurality of manifold modules, the grating has longitudinal edges and wherein the plate is fastened to the grating at the longitudinal edges.

5. Modular manifold means according to claim 2 wherein, in each of said plurality of manifold modules, said plate extends from said open end to said closed end.

6. Modular manifold means according to claim 1 wherein, for each of said plurality of manifold modules, the plate has a thickness and the nozzles have means defining orifices with a diameter larger than 0.7 times the thickness of the plate.

7. Modular manifold means according to claim 6 wherein, for each of said plurality of manifold modules, the grating has longitudinal edges and wherein the plate is fastened to the grating at the longitudinal edges.

8. Modular manifold means according to claim 6 wherein, in each of said plurality manifold modules, said plate extends from said open end to said closed end.

9. Modular manifold means according to claim 1 wherein, for each of said plurality of manifold modules, the grating has longitudinal edges and wherein the plate is fastened to the grating at the longitudinal edges.

10. Modular manifold means according to claim 1 wherein, in each of said plurality of manifold modules, said plate extends from said open end to said closed end.

11. Modular manifold means according to claim 1 wherein said tank has a manhole and connecting pieces for providing an inlet and an outlet for an ammonia synthesis gas.

* * * * *